United States Patent
Wu

(10) Patent No.: US 8,870,395 B2
(45) Date of Patent: Oct. 28, 2014

(54) FACE SHIELD FOR LED DISPLAY SCREEN

(75) Inventor: Hanqu Wu, Shenzhen (CN)

(73) Assignee: Shenzhen Aoto Electronics Co., Ltd., Shenzhen (CN)

( * ) Notice: Subject to any disclaimer, the term of this patent is extended or adjusted under 35 U.S.C. 154(b) by 618 days.

(21) Appl. No.: 13/143,018

(22) PCT Filed: Jan. 20, 2009

(86) PCT No.: PCT/CN2009/000079
§ 371 (c)(1),
(2), (4) Date: Jun. 30, 2011

(87) PCT Pub. No.: WO2010/083624
PCT Pub. Date: Jul. 29, 2010

(65) Prior Publication Data
US 2011/0267699 A1    Nov. 3, 2011

(51) Int. Cl.
*G02B 27/00* (2006.01)
*G09F 9/33* (2006.01)
*G02B 5/00* (2006.01)
*G09F 27/00* (2006.01)

(52) U.S. Cl.
CPC .............. *G09F 9/33* (2013.01); *G02B 27/0018* (2013.01); *G02B 5/003* (2013.01); *G09F 27/008* (2013.01)
USPC .......................................... 359/614; 359/601

(58) Field of Classification Search
CPC ........ G02B 5/00; G02B 5/003; G02B 5/0278; G02B 27/00; G02B 27/0018
USPC .......... 359/599, 601, 613–614, 831, 443–461
See application file for complete search history.

(56) References Cited

U.S. PATENT DOCUMENTS

| | | | | |
|---|---|---|---|---|
| 2,749,794 | A * | 6/1956 | O'Leary | 359/599 |
| 4,573,764 | A * | 3/1986 | Bradley | 359/453 |
| 4,993,806 | A * | 2/1991 | Clausen et al. | 359/456 |
| 5,204,160 | A * | 4/1993 | Rouser | 428/167 |
| 5,771,328 | A * | 6/1998 | Wortman et al. | 385/146 |
| 7,384,173 | B2 * | 6/2008 | Whitney | 362/330 |
| 7,697,200 | B2 * | 4/2010 | May | 359/443 |
| 7,990,614 | B2 * | 8/2011 | Chou | 359/454 |

FOREIGN PATENT DOCUMENTS

| | | |
|---|---|---|
| CN | 2449319 | 9/2001 |
| CN | 2845074 | 12/2006 |
| CN | 101101946 | 1/2008 |
| CN | 201053621 | 4/2008 |
| CN | 101345006 | 1/2009 |
| EP | 1857842 | 11/2007 |
| JP | 2000-305486 | 11/2000 |

* cited by examiner

*Primary Examiner* — Thong Nguyen
(74) *Attorney, Agent, or Firm* — Hamre, Schumann, Mueller & Larson, P.C.

(57) ABSTRACT

A face shield for a light-emitting diode (LED) display screen is provided, which comprises a base and an appearance surface arranged on the base. The appearance surface comprises a plurality of high shading edges, a plurality of low shading edges, and a plurality of light-absorbing black slits formed between the high shading edges and the low shading edges. The appearance surface of the face shield for the LED display screen is made of black matte thermal polyurethane (TPU) elastomer and absorbs a large amount of luminous light or sunlight through the light-absorbing black slits and small light-absorbing slits, thereby dramatically reducing a glare phenomenon and increasing a contrast.

2 Claims, 3 Drawing Sheets

FACE SHIELD FOR LED DISPLAY SCREEN

FIELD OF INVENTION

The present invention relates to a field of a light-emitting diode (LED) display screen, and more particularly to an improved face shield for an LED display screen.

BACKGROUND OF INVENTION

LED display screens have been widely applied nowadays, including outdoor advertisements, sports, transportation, performance show, exhibition, renting, as well as gathering. Currently, thanks to advantages of high resolution, high brightness, and wide view, Surface-Mount Device (SMD) LED display screens have become mainstream products for high-end and middle-end indoor LED display screens and have been gradually applied to high-end outdoor LED screens. As the SMD LED display screen has a higher resolution and SMD LED light has a smaller height compared with a printed circuit board (PCB), there are strict requirements on a face shield for the SMD LED display screen. Generally, a face shield for an LED display screen needs to enlarge a view angle of the LED display screen, and prevents illumination light or sunlight from reflecting on the LED display screen to deteriorate display quality. However, currently, the face shield for the SMD LED display screen is generally made of project materials such as polycarbonate (PC) and no light-absorbing or anti-reflection processing is performed on surfaces of the face shield. As a result, when the illumination light or sunlight irradiates a screen body of the LED display screen, the face shield for the screen body reflects the light, results in a glare phenomenon, and reduces the contrast.

SUMMARY OF THE INVENTION

The present invention is directed to a face shield for an LED display screen, applicable to solve a problem that a face shield for an LED display screen cannot effectively avoid a glare phenomenon and has a low contrast.

Accordingly, the present invention provides a face shield for an LED display screen, which comprises a base and an appearance surface arranged on the base. The appearance surface comprises a plurality of high shading edges, a plurality of low shading edges, and a plurality of light-absorbing black slits formed between the high shading edges and the low shading edges.

Additionally, the base is made of a glass fabric enhanced PC engineering plastic.

Additionally, the appearance surface is made of a black matte TPU elastomer material.

Additionally, each of the high shading edges and the low shading edges has a peak formed by two inclined surfaces.

Additionally, one high shading edge and one low shading edge form one set of shading edge, and a plurality of saw-tooth-shaped teeth are arranged between two sets of shading edges.

Additionally, a plurality of small light-absorbing slits are formed between the saw-tooth-shaped teeth.

Additionally, the base and the appearance surface are both injection molded by using bi-color injection molding technique.

The face shield for the LED display screen provided according to the present invention uses the appearance surface made of the black matte TPU elastomer, and absorbs a large amount of illumination light or sunlight through light-absorbing black slits and small light-absorbing slits, thereby dramatically reducing the glare phenomenon, and enhancing the contrast.

DETAILED DESCRIPTION OF THE INVENTION

To make the objectives, technical solutions, and advantages of the present invention become more apparent, the present invention is further described below in detail with reference to the accompanying drawings and embodiments. It should be understood that, the specific embodiments described herein are mainly intended to demonstrate the present invention, instead of restricting the present invention.

Figure 1:
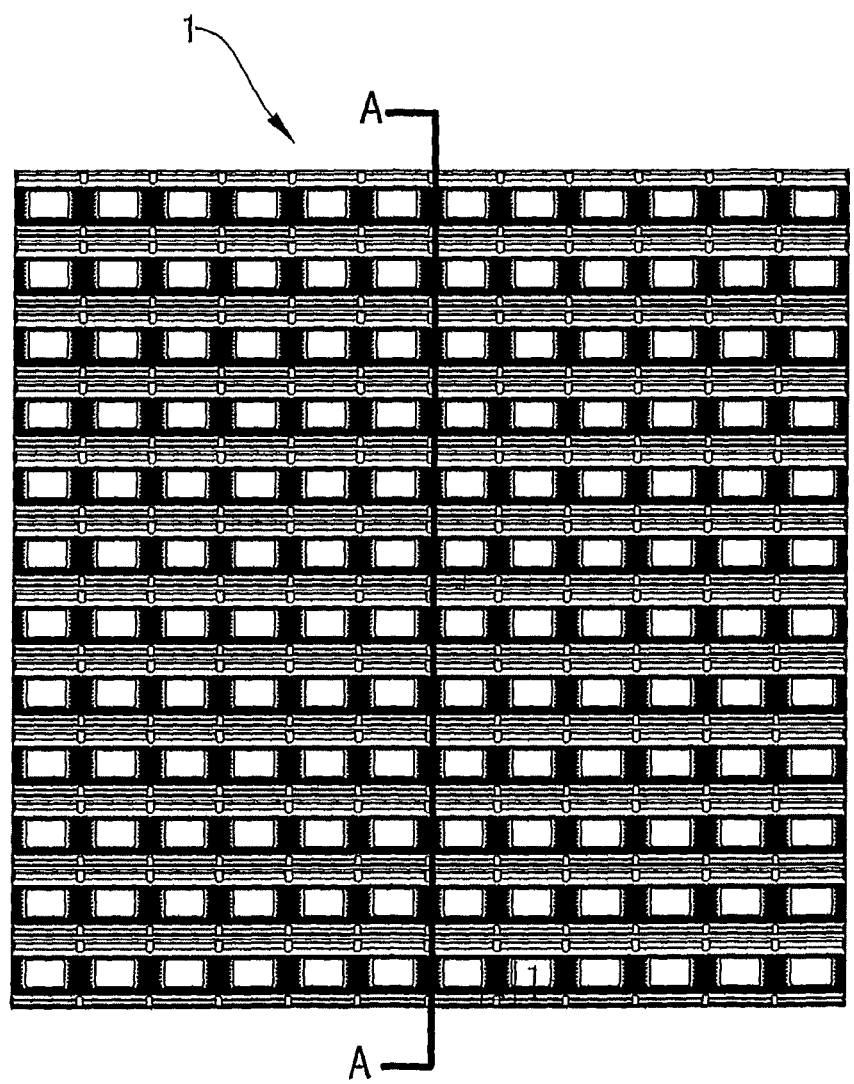
FIG. 1 is a schematic view of an overall structure of a face shield for an LED display screen according to the present invention.
Figure 2:
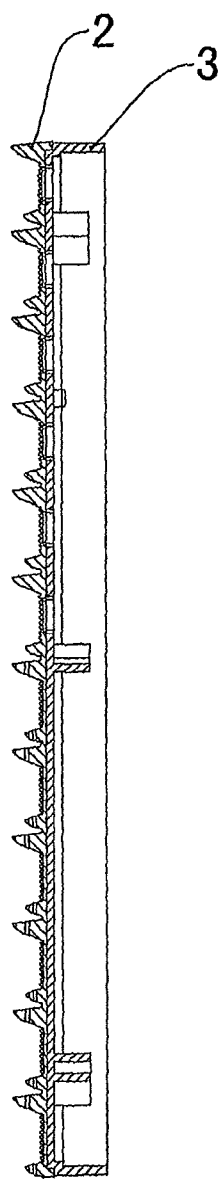
FIG. 2 is a cross-sectional view of FIG. 1, taken along Line A-A.
Figure 3:
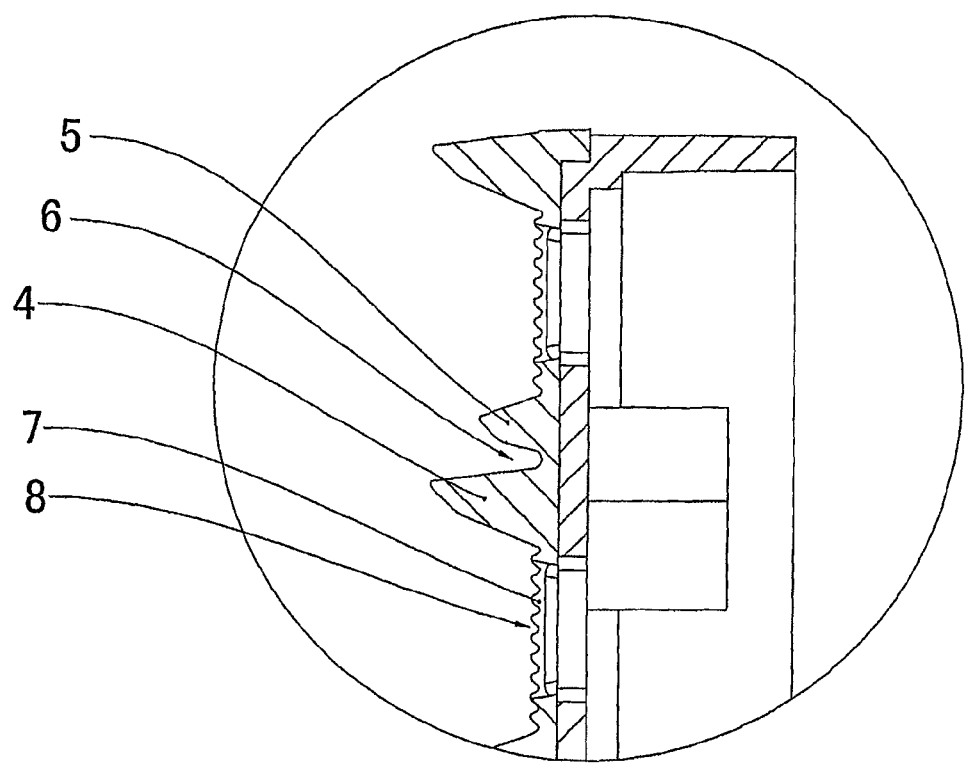
FIG. 3 is an enlarged schematic view of a structure of an appearance surface according to the present invention.

Referring to FIG. 1 and FIG. 2, FIG. 1 is a schematic view of an overall structure of a face shield 1 for an LED display screen according to a preferred embodiment of the present invention, and FIG. 2 is a cross-sectional view of FIG. 1, taken along Line A-A. The face shield 1 for the LED display screen includes a base 3 made of a glass fabric enhanced polycarbonate (PC) engineering plastic and an appearance surface 2 made of a black matte thermal polyurethane (TPU) elastomer material. Referring to FIG. 3, the appearance surface 2 includes a plurality of high shading edges 4, a plurality of low shading edges 5, light-absorbing black slits 6 formed by the high shading edges 4 and the low shading edges 5, a plurality of saw-tooth-shaped teeth 7, and small light-absorbing slits 8.

The base 3 and the appearance surface 2 are both injection molded by using bi-color injection molding technique. Each of the high shading edges 4 and the low shading edges 5 has one peak formed by two inclined surfaces. One light-absorbing black slit 6 is formed between one high shading edge 4 and one low shading edge 5. Each of the saw-tooth-shaped teeth 7 has one peak formed by two large-angle inclined surfaces. One small light-absorbing slit 8 is formed between two adjacent saw-tooth-shaped teeth 7. In the present invention, the face shield 1 for the LED display screen includes the plurality of light-absorbing black slits 6 and the plurality of small light-absorbing slits 8 from top to bottom.

According to a preferred embodiment of the present invention, the face shield 1 for the LED display screen adopts bi-color injection molding solution. The base 3 of the face shield 1 is made of a glass fabric enhanced PC engineering plastic, and the appearance surface 2 is made of a black matte TPU elastomer, to effectively avoid the glare phenomenon. Meanwhile, the appearance surface 2 of the face shield 1 has one set of horizontal shading edge (one high shading edge 4 and one low shading edge 5) between each pixel from top to bottom. One saw-tooth-shaped tooth 7 is provided between each two sets of shading edges. One small light-absorbing slit 8 is arranged between each two adjacent saw-tooth-shaped teeth 7. All shading edges have peak angles at top end. Thus, the face shield 1 absorbs a large amount of illumination light or sunlight through the light-absorbing black slits 6 and the small light-absorbing slits 8, to dramatically reduce the glare phenomenon and increase the contrast.

The above descriptions are merely taken as the preferred embodiment of the present invention, but not intended to restrict the present invention. For example, detailed arrangement of the high shading edges 4 and the low shading edges 5 is not restricted to the arrangement shown in the figure. Any modification, equivalent replacement, and improvement that fall within the spirit and principle of the present invention are included in the protection scope of the claims of the present invention.

What is claimed is:

1. A face shield for a light-emitting diode (LED) display screen, comprising: a base and an appearance surface arranged on the base,
   wherein the appearance surface further comprises a plurality of high shading edges, a plurality of low shading edges, and a plurality of light-absorbing black slits formed between the high shading edges and the low shading edges, the light-absorbing black slits being configured for absorbing ambient illumination light or sunlight,
   wherein one high shading edge and one low shading edge form one set of shading edge, a plurality of saw-tooth-shaped teeth are arranged between two sets of shading edges, and
   wherein a plurality of small light-absorbing slits configured for absorbing ambient illumination light or sunlight are formed between the saw-tooth-shaped teeth.

2. The face shield for the LED display screen according to claim 1, wherein each of the high shading edges and the low shading edges has a peak formed by two inclined surfaces.

\* \* \* \* \*